United States Patent
Gomibuchi et al.

(10) Patent No.: US 9,193,099 B2
(45) Date of Patent: Nov. 24, 2015

(54) METHOD FOR PRODUCING SKIN-COVERED FOAMED MOLDED ARTICLE AND RESULTING PRODUCT

(71) Applicant: JSP CORPORATION, Tokyo (JP)

(72) Inventors: Masahiro Gomibuchi, Shimotsuke (JP); Tomoo Tokiwa, Kanuma (JP)

(73) Assignee: JSP CORPORATION, Tokyo (JP)

( * ) Notice: Subject to any disclaimer, the term of this patent is extended or adjusted under 35 U.S.C. 154(b) by 0 days.

(21) Appl. No.: 13/839,114

(22) Filed: Mar. 15, 2013

(65) Prior Publication Data

US 2013/0280468 A1    Oct. 24, 2013

(30) Foreign Application Priority Data

Apr. 23, 2012  (JP) ................... 2012-97336

(51) Int. Cl.
| | |
|---|---|
| B29C 49/00 | (2006.01) |
| B29C 44/16 | (2006.01) |
| C08J 5/00 | (2006.01) |
| B29C 44/18 | (2006.01) |
| B32B 3/04 | (2006.01) |
| B32B 5/18 | (2006.01) |
| B29C 44/00 | (2006.01) |
| B29C 67/00 | (2006.01) |
| B29C 67/20 | (2006.01) |
| B29C 44/44 | (2006.01) |
| B29K 105/04 | (2006.01) |

(52) U.S. Cl.
CPC ............... *B29C 44/18* (2013.01); *B29C 44/445* (2013.01); *B29C 67/0037* (2013.01); *B29C 67/205* (2013.01); *B29C 67/222* (2013.01); *B29C 67/2215* (2013.01); *B32B 3/04* (2013.01); *B32B 5/18* (2013.01); *C08L 2205/025* (2013.01); *C08L 2205/03* (2013.01); *C08L 2207/20* (2013.01); *Y10T 428/233* (2015.01)

(58) Field of Classification Search
USPC ............... 264/45.3, 45.4, 45.6, 265, 267, 572
See application file for complete search history.

(56) References Cited

U.S. PATENT DOCUMENTS

| | | | | |
|---|---|---|---|---|
| 3,801,244 | A | * | 4/1974 | Eisenberg ..................... 425/102 |
| 5,037,592 | A | * | 8/1991 | Erlenbach ....................... 264/51 |
| 5,366,674 | A | * | 11/1994 | Hattori et al. ................. 264/45.4 |
| 6,607,680 | B1 | * | 8/2003 | Moitzheim ................... 264/45.4 |

(Continued)

FOREIGN PATENT DOCUMENTS

| | | |
|---|---|---|
| EP | 0583542 A1 | 2/1994 |
| JP | H06-339979 | 12/1994 |

(Continued)

OTHER PUBLICATIONS

European Office Communication for EP 13001386 dated Nov. 12, 2014.

(Continued)

*Primary Examiner* — Atul P. Khare
(74) *Attorney, Agent, or Firm* — Bacon & Thomas, PLLC (57) ABSTRACT

A method for producing a skin-covered foamed molded article includes blow molding a parison into a skin and heating expanded polystyrene beads filled in a hollow space of the skin to form a foam layer fuse-bonded to the skin, polystyrene resin composition having specific Charpy impact strength, MFR and branching degree. The skin of the skin-covered foamed molded article is formed of the specific polystyrene resin composition.

4 Claims, 1 Drawing Sheet

(56) References Cited

U.S. PATENT DOCUMENTS

| | | | |
|---|---|---|---|
| 6,610,758 B2 * | 8/2003 | Suzuki | 521/40.5 |
| 2005/0179153 A1 | 8/2005 | Riise et al. | |

FOREIGN PATENT DOCUMENTS

| JP | 2002145968 A | 5/2002 |
|---|---|---|
| JP | 2003-292707 | 10/2003 |
| JP | 2004075865 A * | 3/2004 |
| JP | 2008101125 A | 5/2008 |

OTHER PUBLICATIONS

European Search Report for corresponding EP 13001386 dated Aug. 19, 2013.

* cited by examiner

METHOD FOR PRODUCING SKIN-COVERED FOAMED MOLDED ARTICLE AND RESULTING PRODUCT

BACKGROUND OF THE INVENTION

1. Field of the Invention

The present invention relates to a method for producing a skin-covered foamed molded article having a polystyrene resin foam layer covered with a polystyrene resin skin, and, more particularly, to a method for producing a skin-covered foamed molded article including forming a parison in a molten or softened state, blow molding the parison into a skin defining a hollow interior space, filling expanded polystyrene beads in the hollow interior space, and heating the expanded polystyrene beads filled in the hollow interior space to fuse-bond the expanded polystyrene beads to each other and to form a foam layer fuse-bonded to the skin. The present invention is also directed to a skin-covered foamed molded article.

2. Description of Prior Art

A skin-covered foamed molded article is heretofore known which is produced by placing a resin parison extruded from a die between mold halves and blow molding the parison into a skin defining a hollow interior space, filling expanded resin beads in the hollow interior space, and supplying a heating medium, such as steam, into the skin to cause the expanded polystyrene beads to expand (secondary expansion) and fuse-bond to each other.

Such a skin-covered foamed molded article not only has a good appearance provided by the skin and high thermal insulation properties derived from the foam layer of the expanded beads but also is excellent in mechanical properties, such as bending rigidity and bending strength, in spite of being light in weight because the hollow interior space of the skin is filled with the foam layer. In addition, the mechanical properties of the entire skin-covered foamed molded article can be further improved by firmly fuse-bonding the expanded beads to each other and the resulting foam layer to the skin.

A method for firmly fuse-bonding a foam layer to a skin is disclosed in JP-A-H6-339979. Specifically, disclosed is a method for producing a skin-covered foamed article including filling the hollow interior space of a skin, formed by blow molding, with pre-expanded thermoplastic resin beads before the skin cools and solidifies, and heating the beads to fuse-bond the beads to each other and to form a foam layer. According to this method, the heat remaining in the skin can be used to firmly fuse-bond the foam layer to the skin.

SUMMARY OF THE INVENTION

In an ordinary blow molding process, a small-diameter blow pin is inserted through a parison in a molten or softened state and, thereafter, high-pressure blow air is introduced into the parison through the blow pin to press the parison against an inner surface of the mold to form a hollow molded article with a desired shape. The hollow molded article after having been cooled can be easily released from the mold when the blow air is evacuated, because the contact pressure between the mold and the molded article drops by the evacuation.

In contrast, in the production of a skin-covered foamed molded article, it is necessary to form a foam layer of expanded beads in a hollow interior space of a skin formed by blow molding. Therefore, a hole must be formed in the skin for feeding the expanded beads therethrough into the hollow space and, further, a steam pin must be inserted through the skin for supplying a heating medium, such as steam, into the hollow space in which the expanded beads have been filled. In addition, because the expanded beads are further expanded and fuse-bonded to each other in the hollow space of the skin within the mold, the contact pressure between the mold and the skin does not drop until the expanded beads cools even after cooling of the skin has been completely. Therefore, in order to improve the production efficiency, the skin-covered foamed molded article must be released from the mold while a certain degree of the contact pressure still remains.

Thus, when a polystyrene resin is used as a base resin for the skin of a skin-covered foamed molded article, an impact resistant polystyrene resin containing a rubber component is widely used as the base resin in order to prevent cracks from forming in the skin when the steam pin is inserted through the skin and when the skin-covered foamed molded article is released from the mold.

On the other hand, in the method disclosed in Patent Document 1, the parison tends to be drawn down because the parison must be extruded at a high temperature in order to prevent the skin from cooling and solidifying and to firmly fuse-bond the foam layer to the skin. When an impact resistant polystyrene, which has high impact resistance but is inferior in drawdown resistance, is used as a base resin to produce an elongated skin-covered foamed molded article, the parison tends to be drawn down so much that an upper portion of the parison is thinned and becomes poor in blow-moldability. As a result, a local thin portion is formed in the resulting skin. Because the thin portion has a low heat capacity and therefore cools readily, the adhesion strength between the foam layer and the thin portion of the skin may become insufficient.

Also, when a skin with a complicated shape is formed, it is necessary to increase the internal pressure of the parison during blow molding in order to shape the parison in close conformity with the inner surface of the mold. In this case, when the parison is extruded at a high temperature for the purpose of firmly fuse-bonding the foam layer to the skin, the skin tends to be locally thinned because the melt tension of the parison is lowered. This may also result in insufficient adhesion strength between the foam layer and the thin portion of the skin.

Thus, when an elongated skin-covered foamed molded article having a complicated shape portion, such as a shower panel, is produced, the thickness of the entire skin must be set larger than necessary in view of the drawdown and local decrease in thickness of the parison. Therefore, the resulting skin-covered foamed molded article is cost-unbeneficial and excessively heavy. In addition, it is not easy to form the skin having a complicated shape portion by blow molding and, therefore, the yield and the productivity thereof are low.

A known method used to prevent drawdown of the parison and to improve the blow-moldability of the parison in an ordinary blow molding process is to add a high-molecular weight polystyrene resin to an impact resistant polystyrene. When this method is applied to the production of a skin-covered foamed molded article in which a foam layer is firmly fuse-bonded to a skin, however, the drawdown cannot be sufficiently prevented simply by adding a high-molecular weight polystyrene resin because, as described above, the parison must be extruded and shaped at a high temperature. In addition, when a high-molecular weight polystyrene resin is incorporated into the base resin, it takes time to extrude the parison because the base resin has such a low fluidity in a molten state that the parison cannot be extruded at a high rate. As a result, a lower part of the parison cools and solidifies before the formation of the foam layer, resulting in insufficient adhesion strength between the foam layer and a lower part of the skin.

Another known method is to add a polystyrene resin into which a branched structure has been introduced using a multifunctional monomer, such as divinylbenzene, to an impact resistant polystyrene. This method is effective in producing a relatively short skin-covered molded article with a simple shape. When an elongated skin-covered foamed molded article or a skin-covered foamed molded article with a complicated shape is produced by this method, however, drawdown of the parison or local decrease in thickness of the parison during blow molding cannot be prevented unless a large amount of such a branched polystyrene resin is added. As a result, desired impact resistance cannot be achieved. In addition, the molded article tends to develop cracks when released from the mold depending on its shape.

It is, therefore, an object of the present invention to overcome the above problems and to provide a method by which a skin-covered foamed molded article in which the foam layer is firmly fuse-bonded to the skin can be produced with high productivity even when the skin-covered foamed molded article has an elongated or complicated shape. Another object of the present invention is to provide a skin-covered foamed molded article in which a foam layer is firmly fuse-bonded to the skin.

In accordance with a first aspect of the present invention, there is provided a method for producing a skin-covered foamed molded article, comprising the steps of:

(a) forming a parison in a molten or softened state;

(b) blow molding the parison into a skin defining a hollow interior space;

(c) filling expanded polystyrene beads in the hollow interior space; and (d) heating the expanded polystyrene beads filled in the hollow interior space to fuse-bond the expanded polystyrene beads to each other and to form a foam layer fuse-bonded to the skin, wherein the parison is formed of a polystyrene resin composition that meets the following requirements (1) to (3):

(1) the polystyrene resin composition has a Charpy impact strength at 23° C. according to ISO179/1eA of at least 5 kJ/m$^2$;

(2) the polystyrene resin composition has a melt mass flow rate at a temperature of 200° C. and a load of 5 kg of 1.5 to 3.0 g/10 min;

(3) the polystyrene resin composition has a ratio $Mw_S(abs)/Mw_S(r)$ of at least 1.4 where $Mw_S(abs)$ and $Mw_S(r)$ represent a weight average absolute molecular weight and a linear polystyrene equivalent weight average molecular weight, respectively, of the polystyrene resin composition.

In a second aspect of the present invention, there is provided a method of the first aspect, wherein step (a) comprises melting and kneading a mixture of 30 to 70 parts by weight of a polystyrene resin (A) having a ratio $Mw_A(abs)/Mw_A(r)$ of at least 1.4, where $Mw_A(abs)$ and $Mw_A(r)$ represent a weight average absolute molecular weight and a linear polystyrene equivalent weight average molecular weight, respectively, of the polystyrene resin (A), and 30 to 70 parts by weight of an impact resistant polystyrene resin (B) containing a rubber component to obtain the polystyrene resin composition, and extruding the polystyrene resin composition into the parison, wherein the total of the polystyrene resin (A) and impact resistant polystyrene resin (B) is 100 parts by weight.

In a third aspect, the present invention provides a method of the first aspect, wherein step (a) comprises melting and kneading a mixture of 10 to 30 parts by weight of a polystyrene resin (A) having a ratio $Mw_A(abs)/Mw_A(r)$ of at least 1.4, where $Mw_A(abs)$ and $Mw_A(r)$ represent a weight average absolute molecular weight and a linear polystyrene equivalent weight average molecular weight, respectively, of the polystyrene resin (A), 5 to 30 parts by weight of an impact resistant polystyrene resin (B) containing a rubber component and 40 to 80 parts by weight of a recycled polystyrene resin (C) to obtain the polystyrene resin composition, and extruding the polystyrene resin composition into the parison, wherein the total of the polystyrene resin (A), impact resistant polystyrene resin (B) and recycled polystyrene resin (C) is 100 parts by weight and wherein the recycled polystyrene (C) is obtained from a resin composition which contains the polystyrene resin (A) and the polystyrene resin (B) and which has a weight ratio of the polystyrene resin (A) to the polystyrene resin (B) of 30:70 to 70:30.

In a fourth aspect, the present invention provides a method according to the second or third aspect, wherein the polystyrene resin (A) comprises a copolymer of a styrenic monomer with a multibranched macromonomer having a plurality of polymerizable double bonds.

In a fifth aspect, the present invention provides a method according to any one of the first to fourth aspects, wherein the skin-covered foamed molded article has a maximum length of at least 1 m.

In a sixth aspect, the present invention provides a method according to any one of the first to fifth aspects, wherein the skin has an average thickness of 1 to 3 mm.

In a seventh aspect of the present invention, there is provided a skin-covered foamed molded article, comprising:

a skin having an interior surface defining a hollow interior space; and a foam layer of expanded polystyrene beads which are fuse-bonded to each other, said foam-layer being provided within the hollow interior space and fuse-bonded to the interior surface, wherein the skin is formed of a polystyrene resin composition that meets the following requirements (1) to (3):

(1) the polystyrene resin composition has a Charpy impact strength at 23° C. according to ISO179/1eA of at least 5 kJ/m$^2$;

(2) the polystyrene resin composition has a melt mass flow rate at a temperature of 200° C. and a load of 5 kg of 1.5 to 3.0 g/10 min;

(3) the polystyrene resin composition has a ratio $Mw_S(abs)/Mw_S(r)$ of at least 1.4 where $Mw_S(abs)$ and $Mw_S(r)$ represent a weight average absolute molecular weight and a linear polystyrene equivalent weight average molecular weight, respectively, of the polystyrene resin composition.

In an eighth aspect, the present invention provides a skin-covered foamed molded article according to the seventh aspect, wherein the polystyrene resin composition comprises:

30 to 70 parts by weight of a polystyrene resin (A) having a ratio $Mw_A(abs)/Mw_B(r)$ of at least 1.4, where $Mw_A(abs)$ and $Mw_B(r)$ represent a weight average absolute molecular weight and a linear polystyrene equivalent weight average molecular weight, respectively, of the polystyrene resin (A), and 30 to 70 parts by weight of an impact resistant polystyrene resin (B) containing a rubber component, wherein the total of the polystyrene resin (A) and impact resistant polystyrene resin (B) is 100 parts by weight.

In a ninth aspect, the present invention provides a skin-covered foamed molded article according to the seventh aspect, wherein the polystyrene resin composition comprises:

10 to 30 parts by weight of a polystyrene resin (A) having a ratio $Mw_A(abs)/Mw_A(r)$ of at least 1.4, where $Mw_A(abs)$ and $Mw_A(r)$ represent a weight average absolute molecular weight and a linear polystyrene equivalent weight average molecular weight, respectively, of the polystyrene resin (A), 5 to 30 parts by weight of an impact resistant polystyrene resin (B) containing a rubber component, and 40 to 80 parts by weight of a recycled polystyrene resin (C) obtained from a resin composition containing the polystyrene resin (A) and the polystyrene resin (B) and having a weight ratio of the polystyrene resin (A) to the polystyrene resin (B) of 30:70 to 70:30 wherein the total of the polystyrene resin (A), impact resistant polystyrene resin (B) and recycled polystyrene resin (C) is 100 parts by weight.

In a tenth aspect, the present invention provides a skin-covered foamed molded article according to the eighth or ninth aspect, wherein the polystyrene resin (A) comprises a copolymer of a styrenic monomer with a multibranched macromonomer having a plurality of polymerizable double bonds.

In an eleventh aspect, the present invention provides a skin-covered foamed molded article according to any one of the seventh to tenth aspects, wherein the skin-covered foamed molded article has a maximum length of at least 1 m.

In a twelfth aspect, the present invention provides a skin-covered foamed molded article according to any one of the seventh to eleventh aspects, wherein the skin has an average thickness of 1 to 3 mm.

In the method of the present invention, because the melt flow rate and ratio $Mw_S(abs)/Mw_S(r)$ of the polystyrene resin composition of the polystyrene resin composition of which the parison is formed are within specific ranges, the drawdown of the parison can be reduced while maintaining the extrusion characteristics and blow moidability of the parison. Therefore, the parison is prevented from having an uneven thickness and from rupturing during blow molding. As a result, a skin having an entirely uniform thickness can be produced. Because the skin has no thin portion, the foam layer can be firmly fuse-bonded to the skin in the entire skin-covered foamed molded article. In addition, because the parison is unlikely to be drawn down, it is possible to increase the rubber component content in the parison. Therefore, a skin with excellent impact resistance can be formed. Because this allows the skin to be thinner while maintaining the required rigidity, the skin-covered foamed molded article can be lighter in weight.

BRIEF DESCRIPTION OF DRAWINGS

Other objects, features and advantages of the present invention will become apparent from the detailed description of the preferred embodiments of the invention which follows, when considered in light of the accompanying drawings in which.

DESCRIPTION OF THE PREFERRED EMBODIMENTS

Description is hereinafter made of a method for producing a skin-covered foamed molded article according to the present invention (hereinafter occasionally referred to as "foamed molded article") in detail. The foamed molded article has a skin defining a hollow interior space, and a foam layer formed from expanded polystyrene beads (hereinafter occasionally referred to as "expanded beads"). In the method of the present invention, an apparatus including an extruder, a die equipped with an accumulator and connected to the extruder, and a mold in which a parison is blow-molded, may be used. The mold is equipped with a blow pin, a filling gun for introducing expanded beads into the hollow interior space of the skin, and a plurality of pins (steam pins in particular) through which a heating medium (steam in particular), for heating, expanding (secondary expansion) and fuse-bonding the expanded beads to each other is supplied to the hollow interior space of the skin. Each steam pin has a hole through which is steam is introduced and discharged.

In the method of the present invention, a parison in a molten or softened state formed of a polystyrene resin composition is extruded from the die and suspended between separated mold halves. The mold is then closed while expanding the parison by introducing preblow air thereinto. After the blow pin has been inserted into the parison in the mold, the parison is blow-molded into a skin having a hollow interior space by introducing pressurized gas (blow air) into the parison through the blow pin to press the outer surface of the parison against the inner surface of the mold. In this case, a space between the outer surface of the parison and the inner surface of the mold is optionally depressurized by, for example, evacuating air through vents provided in the mold. The steam pins and filling gun are then inserted into the hollow interior space of the skin. Expanded beads are filled in the hollow interior space through the filling gun while evacuating the hollow interior space through the steam pins. Then, steam is supplied into the skin through some of the steam pins inserted through the skin, with the other steam pins being opened or evacuated. Thus, the expanded beads are heated with steam and fuse-bonded to each other to form a foam layer which is also fuse-bonded to the interior surface of the skin, thereby obtaining the desired foamed molded article. After cooling, the steam pins are removed from the foamed molded article and the mold is opened to take out the foamed molded article from the mold.

Figure 1:
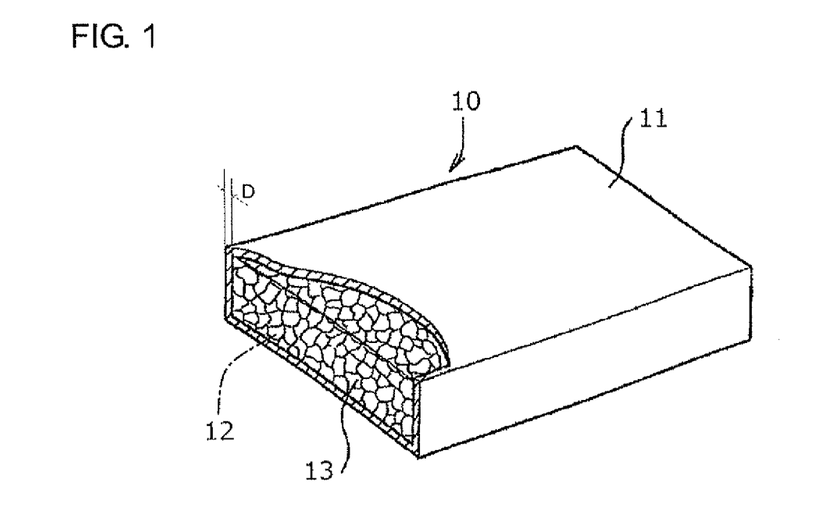
FIG. 1 is a perspective view, cut away in part, schematically illustrating an example of a skin-covered foamed molded article obtained by the method of the present invention.

Any suitable known technique may be used to form the skin having a hollow interior space by blow molding and to form the foam layer in the hollow interior space of the skin. FIG. 1 depicts an example of the foamed molded article obtained by the above-described method. Designated generally as 10 is a skin-covered foamed molded article having a skin 11 with a thickness D and defining a hollow interior space 12. A foam layer 13 of expanded beads fuse bonded to each other is formed in the space 12. The foam layer 13 and the skin 11 are fuse-bonded together at their interface.

In the present invention, the polystyrene resin composition of which the parison is formed has (1) a Charpy impact strength, (2) a melt mass flow rate (hereinafter occasionally referred to as "MFR"), and (3) a branching degree, which are in the following specific ranges:

(1) A Charpy impact strength at 23° C. according to ISO179/1eA (JIS K7111 (1996)) of at least 5 kJ/m$^2$;

(2) A melt mass flow rate according to JIS K7210 (1999), test condition H (at a temperature of 200° C. and a load of 5 kg), of 1.5 to 3.0 g/10 min; and (3) A branching degree (which is defined as a ratio $Mw_S(abs)/Mw_S(r)$ where $Mw_S(abs)$ and $Mw_S(r)$ represent a weight average absolute molecular weight and a linear polystyrene equivalent weight average molecular weight, respectively, of the polystyrene resin composition) of at least 1.4.

The polystyrene resin composition of which the parison is formed for use in the present invention is next described in detail. It is without saying that a skin prepared by blow molding a parison has the same polystyrene resin composition as that of the parison.

In the present invention, the polystyrene resin composition of which the parison is formed may have any composition as long as it meets the above requirements (1) to (3). Specific examples of the polystyrene resin composition includes (i) a composition containing an impact resistant polystyrene resin (sometimes called rubber-modified polystyrene) obtained by polymerization of a styrenic monomer in the presence of a rubber component such as butadiene (hereinafter occasionally referred to as "impact resistant polystyrene resin (S1)"), (ii) a composition containing an impact resistant polystyrene resin (S1) and a styrene elastomer (S2), and (iii) a composition containing a polystyrene resin free of a rubber component (hereinafter occasionally referred to as "polystyrene resin (S3)") and an impact resistant polystyrene resin (S1) and/or a styrene elastomer (S2). The above compositions (i) to (iii) each meet the above requirements (1) to (3). In each of the compositions (i) to (iii), two or more impact resistant polystyrene resins (S1), two or more styrene elastomers (S2) and two or more polystyrene resins (S3) may be used in combination, if desired.

In the present invention, examples of the polystyrene resin (S3) include but not limited to polymers of a styrenic monomer, and copolymers of a styrenic monomer and a vinyl monomer copolymerizable therewith.

Examples of the styrenic monomer include styrene and derivatives thereof. Examples of the derivatives of styrene include but not limited to a-methylstyrene, o-methylstyrene, m-methylstyrene, p-methylstyrene, p-ethylstyrene, 2,4-dimethylstyrene, p-methoxystyrene, p-n-butylstyrene, p-t-butylstyrene, o-chlorostyrene, m-chlorostyrene, p-chlorostyrene, 2,4,6-tribromostyrene, divinylbenzene, styrene sulfonic acid and sodium styrene sulfonate. The above styrenic monomers may be used singly or in combination of two or more. A polymerization product of two or more of the above styrenic monomers may also be used as the styrenic monomer.

Examples of the vinyl monomer copolymerizable with a styrenic monomer include acrylic acid; methacrylic acid; maleic anhydride; acrylic acid esters such as methyl acrylate, ethyl acrylate, propyl acrylate, butyl acrylate and 2-ethylhexyl acrylate; methacrylic acid esters such as methyl methacrylate, ethyl methacrylate, propyl methacrylate, butyl methacrylate and 2-ethylhexyl methacrylate; hydroxyl group-containing vinyl compounds such as hydroxyethyl acrylate, hydroxypropyl acrylate, hydroxyethyl methacrylate and hydroxypropyl methacrylate; nitrile group-containing vinyl compounds such as acrylonitrile and methacrylonitrile; multibranched macromonomers; and maleimide compounds such as N-phenylmaleimide and N-rnethylmaleimide.

Specific examples of the polystyrene resin (S3) include but not limited to polystyrene, styrene-methacrylic acid copolymer, styrene-maleic anhydride copolymer, styrene-methyl methacrylate copolymer and styrene-acrylonitrile copolymer.

When the polystyrene resin (S3) is a copolymer of styrene with a styrene derivative and/or a vinyl monomer component copolymerizable with a styrenic monomer, the content of the styrene component in the copolymer is preferably at least 50% by weight, more preferably at least 80% by weight, still more preferably at least 90% by weight.

The impact resistant polystyrene resin (S1) used in the above compositions (i) to (iii) is, for example, a polystyrene resin obtainable by polymerization of a styrenic monomer in the presence of a rubber, such as butadiene rubber. The impact resistant polystyrene resin may contain a vinyl monomer as a copolymerization component in addition to the styrenic monomer. The styrenic monomer and the vinyl monomer may be similar to those which are described and exemplified above in connection with the polystyrene resin (S3). Specific examples of the impact resistant polystyrene resin include but not limited to a high impact polystyrene (HIPS) obtained by polymerization of styrene in the presence of butadiene rubber or styrene-butadiene rubber, and acrylonitrile-styrene-butadiene copolymer.

Examples of the styrene elastomer (S2) include but not limited to block copolymers of styrene with a rubber component such as butadiene or isoprene. Specific examples include styrene-butadiene-styrene block copolymer, styrene-isoprene-styrene block copolymer, and hydrogen additives thereof.

In the present invention, the polystyrene resin composition of which the parison is formed is required to have (1) a Charpy impact strength at 23° C. according to IS0179/1eA (JIS K7111 (1996)) of at least 5 kJ/m². When the Charpy impact strength is too low, surface regions of the obtained skin are apt to have cracks when the foamed molded article is released from the mold. Also, there is a possibility that cracks may develop from the insertion holes formed by inserting the filling gun or steam pins through the parison. For this reason, the Charpy impact strength is preferably at least 6 kJ/m², more preferably at least 7 kJ/m². While the upper limit of the Charpy impact strength is not particularly limited for the above reason, the upper limit is generally about 20 kJ/m².

The Charpy impact strength of the polystyrene resin composition of which the parison is formed may be adjusted within the above range by a method in which an impact resistant polystyrene resin (S1) having a Charpy impact strength within the range specified in (1) is used singly or together with a styrene elastomer (S2) as needed or a method in which a polystyrene resin (C3) is used together with an impact resistant polystyrene (S1) and/or a styrene elastomer (S2) each having a Charpy impact strength higher than the range specified in (1).

In the present invention, the polystyrene resin composition of which the parison is formed is required to have (2) a melt mass flow rate of 1.5 to 3.0 g/10 min. When the MFR is too low, a high pressure and a long time are needed to extrude the parison. As a result, a lower part of the parison tends to cool and solidify before commencing the blow molding. In addition, the thickness of the parison is difficult to control. When the MFR is too high, the parison tends to be drawn down. For these reasons, the MFR is preferably 1.6 to 2.8 g/10 min.

As used herein, the MFR is a value as measured according to test conditions H (test temperature; 200° C., load: 5 kg) specified in Table 1 of JIS K 7210 (1999).

In the present invention, the polystyrene resin composition of which the parison is formed not only is required to meet the Charpy impact strength and MFR requirements (1) and (2) but also is required to have (3) a branching degree $Mw_S(abs)/Mw_S(r)$ of at least 1.4 where $Mw_S(abs)$ is a weight average absolute molecular weight of the polystyrene resin composition and $Mw_S(r)$ is a weight average molecular weight of the polystyrene resin composition. A higher branching degree means that the polystyrene resin composition has a larger number of branches. A polystyrene resin with a larger number of branches has a higher melt tension (MT) and is less likely to be stretched locally even when extended in a molten or softened state. Further, the temperature dependence of these properties tends to be smaller as the number of branches is larger. Thus, a parison formed of such a polystyrene resin composition is unlikely to be drawn down even when extrusion is carried out at a high temperature in order to firmly fuse-bond the expanded beads to the inner surface of the skin.

Moreover, the parison can be uniformly stretched as a whole even when the molding pressure during blow molding is increased.

When the branching degree is lower than 1.4, the parison is not stretched uniformly by blow molding and the resulting skin tends to have a thin portion or, even worse, may be ruptured at the thin portion. While the upper limit of the branching degree is not particularly limited from the standpoint of drawdown resistance and blow-moldability of the parison, the parison cannot be readily expanded by blow molding when the branching degree is too high. For these reasons, the branching degree is preferably in the range of 1.4 to 2.5, more preferably 1.5 to 2.1.

As used herein, the term "weight average absolute molecular weight Mw(abs)" of a polymer means the real weight average molecular weight thereof. The weight average absolute molecular weight Mw(abs) may be measured by a heretofore known method using a detector system including a differential refractometer, a light scattering detector, and, if necessary, a viscometer. There are three types of light scattering detectors; i.e. low-angle laser light scattering detector (LALLS), multi-angle laser light scattering detector (MALLS) and right-angle laser light scattering detector (RALLS). In the present invention, the weight average absolute molecular weight Mw(abs) is measured by an analysis method using GPC coupled with RALLS.

On the other hand, the term "linear polystyrene equivalent weight average molecular weight Mw(r)" of a polymer means a relative weight average molecular weight thereof obtained using a linear polystyrene with known molecular weight as a standard polymer and can be determined by gel permeation chromatography (hereinafter referred to as "GPC" for brevity) using ultraviolet spectrophotometer (UV) as a detector. The weight average molecular weight Mw(r) serves as an index for fluidity of a polymer in a molten state but does not reflect the real molecular weight of the polymer. For example, when the polymer has a branched structure, the linear polystyrene equivalent weight average molecular weight Mw(r) thereof becomes relatively small compared to the weight average absolute molecular weight Mw(abs) thereof. Therefore, the higher the branching degree of a polymer, the greater its branching degree, which is defined as a ratio Mw(abs)/Mw(r) thereof. A polystyrene resin containing a rubber component has a lower weight average molecular weight Mw(r) and therefore tends to have a higher branching degree than a polystyrene resin which has the same weight average absolute molecular weight Mw(abs) but free of a rubber component. For the purpose of clarity, the weight average absolute molecular weight and the linear polystyrene equivalent weight average molecular weight of the polystyrene resin composition are indicated as $Mw_S(abs)$ and $Mw_S(r)$, respectively, while the weight average absolute molecular weight and the linear polystyrene equivalent weight average molecular weight of the polystyrene resin (A) (which will be described hereinafter) are indicated as $Mw_A(abs)$ and $Mw_A(r)$, respectively.

In the present invention, the polystyrene resin composition of which the parison is formed may be (iii) a mixture of a polystyrene resin (S3) and an impact resistant polystyrene resin (S1) and/or a styrene elastomer (S2) as described above. In this case, the use of a polystyrene resin with a branching degree of at least 1.4 (hereinafter occasionally referred to as "polystyrene resin (A)") as the polystyrene resin (S3) is preferred. While an impact resistant polystyrene resin (S1) or styrene elastomer (S2) has generally a low branching degree, the above requirements (1) to (3) can be readily met when (S1) and/or (S2) are used in the form of a mixture with a polystyrene resin (A). Further, it is preferred that the polystyrene resin (A) be used together with an impact resistant polystyrene resin (S1) which is hereinafter referred to as impact resistant polystyrene resin (B).

The polystyrene resin (A) may be obtained by copolymerization of a styrenic monomer with a multibranched macromonomer having a plurality of polymerizable double bonds. The multibranched macromonomer is a macromonomer which has a plurality of branches and a plurality of polymerizable double bonds at the terminal ends of the branches and which preferably has a linear polystyrene equivalent weight average molecular weight Mw(r) of 1,000 to 15,000, more preferably 3,000 to 8,000. Such a multibranched macromonomer preferably has, in its molecule, a branched structure formed by tertiary or quaternary carbon atoms each having one bond bonded to an electron attracting group and all the other three bonds bonded to other carbon atoms, or by repetition of a structural unit having an ether linkage, an ester linkage or an amide linkage. Such a multibranched macromonomer and a multibranched structure formed thereby are described in detail in JP-A-2003-292707.

The polystyrene resin (A) has a branching degree (a ratio $Mw_A(abs)/Mw_A(r)$) of at least 1.4, preferably at least 1.6, more preferably at least 1.8. The polystyrene resin (A) preferably has a linear polystyrene equivalent weight average molecular weight $Mw_A(r)$ of $3.0 \times 10^5$ to $5.0 \times 10^5$, more preferably $3.5 \times 10^5$ to $4.5 \times 10^5$. When the polystyrene resin (A) has a high degree of branching and $Mw_A(r)$ within the above range, the parison shows high fluidity during extrusion and, yet, has good drawdown resistance and good blow-moldability. Thus, the contents of the impact resistant polystyrene (B) and styrene elastomer (S2) in the polystyrene resin composition of which the parison is formed can be increased. This is preferred because a skin-covered foamed molded article with higher impact resistance can be produced.

To meet the requirements (1) to (3), the polystyrene resin (A) preferably has a melt mass flow rate (MFR) of 0.5 to 2.5 g/10 min, more preferably 0.6 to 2.0 g/10 min, much more preferably 0.7 to 1.5 g/10 min.

To meet the requirements (1) to (3), the impact resistant polystyrene resin (B) preferably has a Charpy impact strength measured at 23° C. according to IS0179/1eA (JIS K7111 (1996)) of at least 10 kJ/m². When the Charpy impact strength value is high, a parison with a higher drawdown resistance and good blow-moldability can be formed because the content of the polystyrene resin (B) can be reduced, in other words, the content of the polystyrene resin (A) can be increased. For this reason, the Charpy impact strength of the impact resistant polystyrene resin (B) is more preferably at least 11 kJ/m², much more preferably at least 12 kJ/m².

To meet the requirements (1) to (3), the impact resistant polystyrene resin (B) preferably has a melt mass flow rate of 1.0 to 5.0 g/10 min, more preferably 1.2 to 4.0 g/10 min, much more preferably 1.5 to 3.5 g/10 min.

To obtain a polystyrene resin composition of which a desired parison is formed, 30 to 70 parts by weight of the polystyrene resin (A) and 30 to 70 parts by weight of the impact resistant polystyrene resin (B) (where the total of (A) and (B) is 100 parts by weight) are preferably mixed. More preferably, 40 to 70 parts by weight of the polystyrene resin (A) and 30 to 60 parts by weight of the polystyrene resin (B) (where the total of (A) and (B) is 100 parts by weight) are mixed. The mixture is melted, kneaded and extruded into a parison formed of the polystyrene resin composition.

In the present invention, it is also preferred that the parison be formed of a polystyrene resin composition containing, in addition to the polystyrene resin (A) and the impact resistant polystyrene resin (B), a recycled polystyrene resin (C) obtained by preliminarily mixing the polystyrene resin (A) and the impact resistant polystyrene resin (B) at a weight ratio (A:B) of 30:70 to 70:30. The polystyrene resin (C) may be obtained as a recycled material from, for example, fins or skins removed from skin-covered molded articles. To obtain a styrene resin composition containing such a polystyrene resin (C), 10 to 30 parts by weight of the polystyrene resin (A), 5 to 30 parts by weight of the impact resistant polystyrene resin (B) and 40 to 80 parts by weight of the polystyrene resin (C) (where the total of (A), (B) and (C) is 100 parts by weight) are mixed. The mixture is melted, kneaded and extruded into a parison formed of the polystyrene resin composition.

When the polystyrene resin (A) has a very high degree of branching, the polystyrene resin (A) may be immiscible with the impact resistant polystyrene resin (B). However, when a recycle polystyrene resin (C) obtained by preliminarily melting and kneading the polystyrene resin (A) and the impact resistant polystyrene resin (B) is used in combination with the polystyrene resin (A) and the impact resistant polystyrene resin (B), the polystyrene resin (A) can be well mixed with the impact resistant polystyrene resin (B) and the resulting parison exhibits better stretch during blow molding. As a result, a skin with a more uniform thickness can be obtained. In addition, because the parison has a higher fluidity in a molten state while maintaining the drawdown resistance and blow-moldability, the time necessary to complete the extrusion of the parison can be shortened and the foam layer can be therefore fuse-bonded to the skin more firmly. Further, the surface conditions of the skin can be improved. For these reasons, it is more preferred that 15 to 25 parts by weight of the polystyrene resin (A), 10 to 25 parts by weight of the impact resistant polystyrene resin (B) and 50 to 70 parts by weight of the polystyrene resin (C) be mixed (where the total of (A), (B) and (C) is 100 parts by weight).

When an elongated skin-covered foamed molded article with a length of at least one meter (1 m) is produced according to conventional methods, the thickness of the skin must be set greater than necessary in view of the drawdown and blow-moldability of the parison. According to the present invention, on the other hand, the thickness of the skin (shown as D in FIG. 1) does not have to be set greater than necessary even when an elongated skin-covered foamed molded article with a length of at least one meter is produced. As a result, it is possible to produce a skin-covered foamed molded article which has a skin with an average thickness of as small as 1 to 3 mm and high thickness-uniformity in the extrusion direction and in which the foam layer is firmly fuse-bonded to the skin.

In the present invention, the average thickness of the skin is calculated by removing the foam layer from the skin-covered foamed molded article, weighing the skin, obtaining the weight per unit area of the skin by dividing the weight of the skin by the surface area thereof, and dividing the weight per unit area of the skin by the density of the polystyrene resin composition forming the skin.

According to the method of the present invention, a skin-covered foamed molded article in which the foam layer is firmly fuse-bonded to the skin can be produced even when the skin-covered foamed molded article has a maximum length of at least one meter. A foamed molded article with a maximum length of at least one meter can be suitably used in the application of a housing material such as a shower panel. For this reason, the maximum length (shown as L in FIG. 2) is more preferably at least 1.5 meters, still more preferably at least two meters. The upper limit of the maximum length is approximately five meters.

The expanded polystyrene beads for use in the present invention are next described. In the present invention, the base resin of the expanded polystyrene beads contains a polymer of a styrenic monomer, a copolymer of two or more styrenic monomers, or a copolymer of styrene with a monomer other than a styrenic monomer, such as high impact polystyrene resin (HIPS), styrene-methyl methacrylate copolymer (MS), styrene-acrylonitrile copolymer (AS) or acrylonitrile-butadiene-styrene copolymer (ABS). The base resin may additionally contain a polyolefin resin such as polyethylene or polypropylene, a polyester resin such as polyethylene terephthalate or polylactic acid, methyl polymethacrylate or polyphenylene ether. The proportion of the styrenic monomer component in the base resin for the expanded polystyrene beads is preferably 60 to 100% by weight, more preferably 70 to 100% by weight, for reasons of good expandability, good in-mold moldability and good versatility.

The expanded polystyrene beads preferably have a particle size in the range of 1.0 to 3.5 mm, more preferably in the range of 1.5 to 3.2 mm. When the particle size of the expanded polystyrene beads is in this range, the expanded polystyrene beads can be readily filled into small and narrow spaces in the hollow interior space of the skin and the resulting foam layer has excellent mechanical physical properties.

Any conventional blowing agent for use in the production of expanded polystyrene beads may be used to produce the expanded polystyrene beads for use in the present invention. Examples of the blowing agent include hydrocarbons such as propane, normal butane, isobutene, pentane and cyclopentane, chlorinated hydrocarbons such as methyl chloride and ethyl chloride, and inorganic gases such as air, carbon dioxide and nitrogen. Among the blowing agents, the use of a hydrocarbon such as normal butane, isobutene, pentane or cyclopentane is preferred because the expanded polystyrene beads can be firmly fuse-bonded to each other.

The foam layer obtained by secondarily expanding and fuse-bonding the expanded beads to each other in the hollow interior space of the skin preferably has an apparent density of 15 to 40 kg/m$^3$, more preferably 15 to 30 kg/m$^3$. When the foam layer has an apparent density in this range, the resulting foamed molded article is sufficiently strong and light for practical use.

When the adhesion strength between the skin and the foam layer is insufficient, the foamed molded article is poor in mechanical strength, especially in bending rigidity and bending strength. In addition, when the adhesion strength between the skin and the foam layer is insufficient, interfacial debonding occurs at the interface between the skin and expanded polystyrene beads. In contrast, when the skin and the foam layer are firmly fuse-bonded to each other, the adhesion strength between the skin and foam layer exceeds the material strength of the expanded polystyrene beads or the adhesion strength between the expanded polystyrene beads in the foam layer. In this case, when a skin-peeling test in which the skin is forcibly separated from the foam layer is conducted, the expanded polystyrene beads undergo inter-beads separation or intra-bead material failure. From the standpoint of sufficient adhesion strength, it is preferred that the proportion of expanded polystyrene beads which undergo intra-bead material failure and inter-beads separation be higher than that of expanded polystyrene beads which undergo separation from the skin in the skin-peeling test. When the proportion (%) of the number of expanded polystyrene beads which undergo intra-bead material failure and inter-beads separation based on the total number of expanded polystyrene beads present in the cross-section along which the skin and the foam layer are separated from each other is defined as degree of fusion bonding, the degree of fusion bonding is preferably at least 30%, more preferably at least 50%, much more preferably at least 70%.

When the expanded polystyrene beads are fuse-bonded to form a foam layer, the content of the blowing agent in the expanded polystyrene beads is preferably as low as possible for higher adhesion strength to the skin. The blowing agent content in the expanded polystyrene beads may be reduced by storing the expanded polystyrene beads formed by heating expandable resin beads in a ventilated container until the blowing agent dissipates from the expanded polystyrene beads and decreases to a desired level. Alternately, expanded polystyrene beads with a reduced blowing agent content may be obtained by preparing expandable resin beads with a low blowing agent content and then pre-expanding the expandable beads to a predetermined apparent density (expansion ratio) using steam with a higher temperature than normal.

EXAMPLES

The following examples and comparative examples will further illustrate the skin-covered foamed molded article and method for the production thereof according to the present invention. It should be noted that the present invention is not limited to the examples.

The grade names, manufacturers and physical properties of the resins used as the polystyrene resins (A), the grade names, manufacturers and physical properties of the resins used as the polystyrene resins (B), and the composition and physical properties of the resins used as the polystyrene resins (C) in the examples and comparative examples are shown in Tables 1, 2 and 3, respectively. In Table 1, Resin A1 and Resin A2 are copolymers of a multibranched macromonomer having a plurality of polymerizable double bonds with a styrenic monomer, and Resin A3 is a heretofore known branched polystyrene made from a multifunctional monomer. In Table 2, Resin B1 and Resin B2 are impact resistant polystyrene resins containing a rubber component. Resins C1 to C3 were all obtained by melting and kneading the resins shown in the column of "Kind" in an extruder set at a temperature of 230° C. to form a repelletized resin and then further melting and kneading the repelletized resin in an extruder set at a temperature of 230° C. In Tables 2 and 3, $Mw_B(abs)$ and $Mw_C(abs)$ are weight average absolute molecular weight of Resin B and Resin C, respectively, while $Mw_B(r)$ and $Mw_C(r)$ are linear polystyrene equivalent weight average molecular weight of Resin B and Resin C, respectively.

TABLE 1

| | Grade name | Manufacturer | MT [cN] | MFR [g/10 min] | $Mw_A(abs)$ | $Mw_A(r)$ | Branching degree | Charpy impact strength [KJ/m$^2$] |
|---|---|---|---|---|---|---|---|---|
| Resin A1 | HP555 | DIC Co. Ltd. | 34 | 0.9 | $5.7 \times 10^5$ | $4.0 \times 10^5$ | 1.42 | 2.5 |
| Resin A2 | EXP1002 | DIC Co. Ltd. | 61 | 0.8 | $8.0 \times 10^5$ | $4.3 \times 10^5$ | 1.85 | 1.7 |
| Resin A3 | G9401 | PS Japan Co., Ltd. | 30 | 2.2 | $3.7 \times 10^5$ | $3.2 \times 10^5$ | 1.14 | 1.6 |

TABLE 2

| | Grade name | Manufacturer | MT [cN] | MFR [g/10 min] | $Mw_B(abs)$ | $Mw_B(r)$ | Branching degree | Charpy impact strength [KJ/m$^2$] | Rubber content [wt %] |
|---|---|---|---|---|---|---|---|---|---|
| Resin B1 | H0104 | PS Japan Co., Ltd. | 8 | 3.0 | $1.7 \times 10^5$ | $1.6 \times 10^5$ | 1.11 | 12 | 12 |
| Resin B2 | 433 | PS Japan Co., Ltd. | 2 | 21 | $1.6 \times 10^5$ | $1.3 \times 10^5$ | 1.19 | 6.3 | 7 |

TABLE 3

| | Kind | Blending ratio | MT [cN] | MFR [g/10 min] | $Mw_C(abs)$ | $Mw_C(r)$ | Charpy impact strength [KJ/m$^2$] | Rubber content [wt %] |
|---|---|---|---|---|---|---|---|---|
| Resin C1 | HP555/H0104 | 60/40 | 10 | 3.4 | $2.9 \times 10^5$ | $2.0 \times 10^5$ | 1.47 | 7.7 |
| Resin C2 | EXP1002/H0104 | 60/40 | 10 | 4.4 | $3.7 \times 10^5$ | $2.2 \times 10^5$ | 1.65 | 7.1 |
| Resin C3 | G9401/H0104 | 60/40 | 13 | 4.3 | $2.9 \times 10^5$ | $2.1 \times 10^5$ | 1.37 | 7.2 |

Examples 1 to 4 and Comparative Examples 1 to 6

The polystyrene resin (A) and the polystyrene resin (B) of the types shown in Table 4 were blended in a dry state at a blending ratio shown in Table 4. The blend was fed to an extruder with an inside diameter of 135 mm and melted and kneaded therein at approximately 210° C. to prepare a molten resin (styrene resin composition) for forming skin. Then, the molten resin was filled in an accumulator adjusted to 210° C., and extruded from a die with a diameter of 900 mm at the downstream end of the accumulator to form a cylindrical parison.

The resulting parison was blow-molded with a blow molding device having a pair of mold halves and a pair of rectangular metal frames (each with inside dimensions of 216.5 cm×98.5 cm) disposed to surround respective mold halves. The frames are moveable independently of the mold halves and configured to clamp a parison placed between the mold halves. As the mold halves move toward the closure position after the parison has been clamped by the frames, the parison is compressed by the mold halves. Accordingly, the internal pressure of the parison gradually increases during a time period (ΔT) between completion of clamping of the parison by the frames and completion of closure of the mold halves.

The blow molding was carried out as follows. The parison in a softened state was pinched at a lower portion thereof and placed between the above-described mold halves (adjusted to a temperature of 80° C.) for forming a shower panel (the external dimensions: maximum length 200 cm, width 80 cm, depth 38 cm and representative thickness: 9 cm) located directly beneath the die while preblowing pressurized air with a source pressure of 0.5 MPa (G) into the parison. Then, the frames were actuated to clamp the parison. The molds were closed 1.0 second after completion of the clamping (namely, the time period ΔT is 1.0 sec). Then, a blow pin was inserted through the parison, and the parison was blow molded into a skin defining a hollow interior space by introducing blow air with a source pressure of 0.5 MPa(G) into the parison through the blow pin. The blow molding of the parison was carried out so as to obtain a skin having the aimed average thickness shown in Table 4. In Comparative Examples 2, 3 and 5, the desired skin was unable to be formed ("no" is given in the column of "Skin formation" in Table 4) and the subsequent molding of a foam layer was not carried out.

Two (2) filling guns with an outside diameter of 36 mm and fifty four (54) equally spaced apart steam pins with an outside diameter of 10 mm were inserted through the skin from the reverse side thereof (the side opposite the design surface), and expanded polystyrene beads with a bulk density of 20 kg/m$^3$ (bulk expansion ratio of 50 times) and average particle size of 2.5 mm were filled in the hollow interior space of the skin through the filling guns while evacuating air through the steam pins. Then, the expanded polystyrene beads were heated by supplying steam with a source pressure of 0.08 MPa(G) through half of the steam pins for 20 seconds and then through the other steam pins for another 20 seconds to expand the expanded polystyrene beads, to fill the voids among the expanded polystyrene beads and to fuse-bond the expanded polystyrene beads to each other into a foam layer fuse-bonded to the inner surface of the skin, whereby a skin-covered foamed molded article was obtained. The apparent density of the foam layer was approximately 20 kg/m$^3$. The foregoing procedures were repeated in the same manner as described so that foamed molded articles of Examples 1 to 4 and Comparative Examples 1, 4 and 6 as summarized in Table 4 were obtained. FIG. 1 schematically shows a perspective view of the resulting skin-covered foamed molded article.

Examples 5 to 8 and Comparative Example 7

Skin-covered foamed molded articles were obtained in the same manner as in Example 1 except that, as shown in Table 5, the polystyrene resin (C) was mixed to the polystyrene resin (A) and the polystyrene resin (B).

The composition, MFR, Charpy impact strength and branching degree of the base resin and the results of evaluation on the moldability of the parison including drawdown resistance and blow moidability in Examples and Comparative Examples are shown in Tables 4 and 5. The physical properties of the foamed molded articles obtained in Examples and Comparative Examples are also shown in Tables 4 and 5, No evaluation was conducted on the physical properties of the foamed molded article in Comparative Examples 2, 3 and 5 because of failure to obtain a skin-covered foamed molded article.

TABLE 4

| | | | | | Blow molding conditions | | | | |
| | Kind | Blending ratio | MFR [g/10 min] | Charpy impact strength [kJ/m$^2$] | Branching degree $Mw_S(abs)/Mw_S(r)$ | Drawdown resistance [sec] | Blow moldability [sec] | Aimed skin thickness [mm] | Molding performance | |
| | | | | | | | | | Skin formation | Mold releasability |
|---|---|---|---|---|---|---|---|---|---|---|
| Ex. 1 | A1/B1 | 60/40 | 1.6 | 8.1 | 1.60 | 40 | good | 2.8 | yes | good |
| Ex. 2 | A1/B1 | 60/40 | 1.6 | 8.1 | 1.60 | 40 | good | 2.2 | yes | good |
| Ex. 3 | A2/81 | 60/40 | 1.7 | 7.5 | 2.05 | 50 | good | 2.8 | yes | good |
| Ex. 4 | A2/B1 | 60/40 | 1.7 | 7.5 | 2.05 | 50 | good | 2.2 | yes | good |
| Comp. 1 | A3/B1 | 60/40 | 2.5 | 7.6 | 1.27 | 22 | 0.5 | 3.3 | yes | good |
| Comp. 2 | A3/B1 | 60/40 | 2.5 | 7.6 | 1.27 | 22 | — | 2.8 | no | — |
| Comp. 3 | A3/B1 | 75/25 | 2.4 | 5.5 | 1.32 | 26 | — | 2.8 | no | — |
| Comp. 4 | A3/B1 | 90/10 | 2.3 | 4.0 | 1.35 | 30 | 0.7 | 2.8 | yes | poor |
| Comp. 5 | A1/B1 | 5/95 | 2.9 | 11.5 | 1.32 | 8 | — | 2.8 | no | — |
| Comp. 6 | A1/B2 | 75/25 | 5.9 | 3.8 | 1.69 | 18 | 0.8 | 2.8 | yes | poor |

| | Properties of skin-covered blow molded article | | | | | | | | |
| | Skin | | | | | Degree effusion bonding | | | |
| | | | | | | Between skin and foam layer [%] | Between expanded beads [%] | Weight [kg] | Surface appearance |
| | T [mm] | T1 [mm] | T1/T [%] | Tx [mm] | Tx/T1 [%] | | | | |
|---|---|---|---|---|---|---|---|---|---|
| Ex. 1 | 2.9 | 1.8 | 62 | 1.3 | 72 | 90 | 70 | 13.6 | good |
| Ex. 2 | 2.2 | 1.4 | 64 | 1.0 | 71 | 80 | 70 | 13.1 | good |
| Ex. 3 | 2.9 | 1.8 | 62 | 1.4 | 78 | 90 | 70 | 13.6 | good |
| Ex. 4 | 2.2 | 1.4 | 64 | 1.2 | 86 | 90 | 70 | 13.1 | good |
| Comp. 1 | 3.3 | 1.8 | 55 | 1.0 | 56 | 60 | 70 | 14.2 | good |
| Comp. 2 | — | — | — | — | — | — | — | — | — |
| Comp. 3 | — | — | — | — | — | — | — | — | — |
| Comp. 4 | 3.1 | 1.6 | 52 | 1.1 | 69 | 60 | 70 | 13.8 | good |
| Comp. 5 | — | — | — | — | — | — | — | — | — |
| Comp. 6 | 2.8 | 1.5 | 54 | 0.9 | 60 | 50 | 60 | 13.4 | good |

TABLE 5

| | | | | Charpy impact | Branching degree | Drawdown | Blow | Aimed skin | Molding performance | |
|---|---|---|---|---|---|---|---|---|---|---|
| | | | | | | | | | Skin | Mold |
| | Kind | Blending ratio | MFR [g/10 min] | strength [KJ/m²] | $Mw_S(abs)/Mw_S(r)$ | resistance [sec] | moldability [sec] | thickness [mm] | formation | releasability |
| Ex. 5 | A1/B1/C1 | 18/12/70 | 2.5 | 7.7 | 1.55 | 26 | good | 2.8 | yes | good |
| Ex. 6 | A1/B1/C1 | 18/12/70 | 2.5 | 7.7 | 1.55 | 26 | good | 2.2 | yes | good |
| Ex. 7 | A2/B1/C2 | 18/12/70 | 2.4 | 7.1 | 1.86 | 31 | good | 2.8 | yes | good |
| Ex. 8 | A2/B1/C2 | 18/12/70 | 2.4 | 7.1 | 1.86 | 31 | good | 2.2 | yes | good |
| Comp. 7 | A3/B1/C3 | 18/12/70 | 2.9 | 7.2 | 1.31 | 16 | 0.3 | 3.5 | yes | good |

| | Skin | | | | | Degree effusion bonding | | | |
|---|---|---|---|---|---|---|---|---|---|
| | | | | | | Between skin and foam layer [%] | Between expanded beads [%] | Weight [kg] | Surface appearance |
| | T [mm] | T1 [mm] | T1/T [%] | Tx [mm] | Tx/T1 [%] | | | | |
| Ex. 5 | 3.0 | 1.8 | 60 | 1.2 | 67 | 90 | 70 | 13.6 | excellent |
| Ex. 6 | 2.3 | 1.4 | 61 | 1.0 | 71 | 80 | 70 | 13.2 | excellent |
| Ex. 7 | 3.0 | 1.8 | 60 | 1.3 | 72 | 90 | 70 | 13.6 | excellent |
| Ex. 8 | 2.3 | 1.4 | 61 | 1.1 | 79 | 90 | 70 | 13.2 | excellent |
| Comp. 7 | 3.5 | 1.8 | 51 | 1.0 | 56 | 60 | 70 | 14.5 | excellent |

The blow molding conditions, blow molding performance and properties of the skin-covered blow molded articles in Tables 4 and 5 were measured as follows. Since the polystyrene resin composition of which a parison is formed is the same as that of a skin produced from the parison, the skins of the produced blow molded articles were used to determine the Charpy impact strength, MFR, $Mw_S(abs)$ and $Mw_S(r)$ of the parisons. Thus, three measurement specimens were randomly cut out of the skin of each of the foamed molded articles for measuring each of the Charpy impact strength, MFR, $Mw_S(abs)$ and $Mw_S(r)$. The arithmetic mean of the three measured values represents of the Charpy impact strength, MFR, $Mw_S(abs)$ and $Mw_S(r)$ of each polystyrene resin composition.

Charpy Impact Strength:

A specimen with a size of 80 mm×10 mm×4 mm was prepared by injection molding and a notch with a radius of 0.25 mm was formed in the specimen. The specimen was then subjected to state conditioning in an atmosphere with a temperature of 23° C. and a relative humidity of 50% for 24 hours. After the state conditioning, the Charpy impact strength was measured in an atmosphere with a temperature of 23° C. according to IS0179/1eA (JIS K7111 (1996)).

MFR:

The MFR was measured according JIS K 7210 (1999), test condition H (200° C., load: 5 kg).

$Mw_S$ Abs $Mw_S$ r and Branching Degree:

The linear polystyrene equivalent weight average molecular weight $Mw_S(r)$ was measured using a UV spectrophotometer detector, while the weight average absolute molecular weight $Mw_S(abs)$ was measured using a triple detector system composed of a differential refractive index detector, RALLS and a differential pressure viscometer detector.

GPC Device:

GPC mode high-speed liquid chromatograph (manufactured by GL Sciences Inc.);

Column:

Shodex GPC columns KF-806, KF-805 and KF-803 (manufactured by Showa Denko Co., Ltd.) connected in series in this order;

Detectors:

UV (UV spectrophotometer): UV702 (manufactured by GL Sciences Inc.),

RI (Differential refractive index detector): Shodex RI-101 (manufactured by Showa Denko Co., Ltd.), Visc (Differential pressure viscometer detector)

RALLS (90° Laser light scattering detector): TDA Model 270 (manufactured by Viscotek Corp.)

Conditions:
  Mobile phase: Tetrahydrofuran (flow rate: 1.0 ml/min)
  Sample concentration: about 1.5 mg/cm³
  Sample injection volume: 200 µL
  Column temperature: 40° C.
  RI thermostat-controlled temperature: 40° C.
  UV measured wavelength: 254 nm
  RALLS light source wavelength: 670 nm Separately from the above-described preparation of the foamed molded articles, parisons were extruded and formed into skins in the same manner as described above only for the purpose of evaluating the drawdown resistance and blow moldability thereof.

Drawdown Resistance:

Under the same parison extrusion conditions as those for the production of the skin-covered molded article in each Example and Comparative Example, the parison was extruded from a die at a discharge rate of 3,000 kg/hr for 10 seconds with the distance between the lips of the die adjusted to 2 mm. The drawdown resistance of the parison was evaluated by measuring the time for the lower end of the parison to reach a position 250 cm below the die after reaching a position 100 cm below the die. The longer the time for the lower end of a parison to reach the 250 cm position, the better is the drawdown resistance of the parison.

Blow Moldability:

Parisons were blow-molded using the same blow molding device as used in Example 1 while varying the time period (ΔT) between the clamping of the parison by the frames and the closure of the mold halves. With an increase of the time period (ΔT), the internal pressure of the parison increases, so that, in the subsequent blow molding step, the parison can be shaped, without forming wrinkles, in conformity with the shape of the mold cavity even with a complicated shape, although the likelihood of rupture of the parison increases. In contrast, as the time period (ΔT) decreases, the internal pressure of the parison becomes less high so that the parison, in the subsequent blow molding step, is less likely to rupture but is less likely to be shaped in conformity with the shape of the mold or the resulting blow molded body is more likely to have wrinkles. In order to determine the minimum time period (ΔTmin [sec]) at and beyond which no wrinkles are formed in the resulting skin and the maximum time period (ΔTmax [sec]) beyond which rupture of the parison results, the time period (ΔT) was increased stepwise from 0 second (the mold closure was completed simultaneously with the completion of the clamping of the parison, in other words, the frame was not actuated) by making the timing of the start of the frame actuation earlier by 0.1 second increments until rupture of the parison occurred. The evaluation results of the blow moldability of the parison are shown in Tables 4 and 5, in which "good" means that (ΔTmax–ΔTmin) was 1.5 seconds or longer, and "–" means that the parison was unable to be blow molded into a skin. Actual (ΔTmax–ΔTmin) values are shown when (ΔTmax–ΔTmin) was 1.4 seconds or shorter. From the standpoint of blow moidability, it is desired that a parison provide a large (ΔTmax–ΔTmin (sec)) within which a desired skin free of wrinkles and rupture is successfully obtainable from the parison.

Mold Releasability:

At the time the foamed molded article was released from the mold, releasability was evaluated as follows:

Good: The skin of the foamed molded article did not develop cracks at all

Poor: The skin developed cracks

Average Thickness T of Entire Skin:

The foam layer was removed from the skin-covered foamed molded article and the weight of only the skin was measured. The weight of the skin was divided by the surface area of the skin, and the result was divided by the density of the polystyrene resin composition of the skin, whereby the average thickness T [mm] of the entire skin was obtained.

Figure 2:
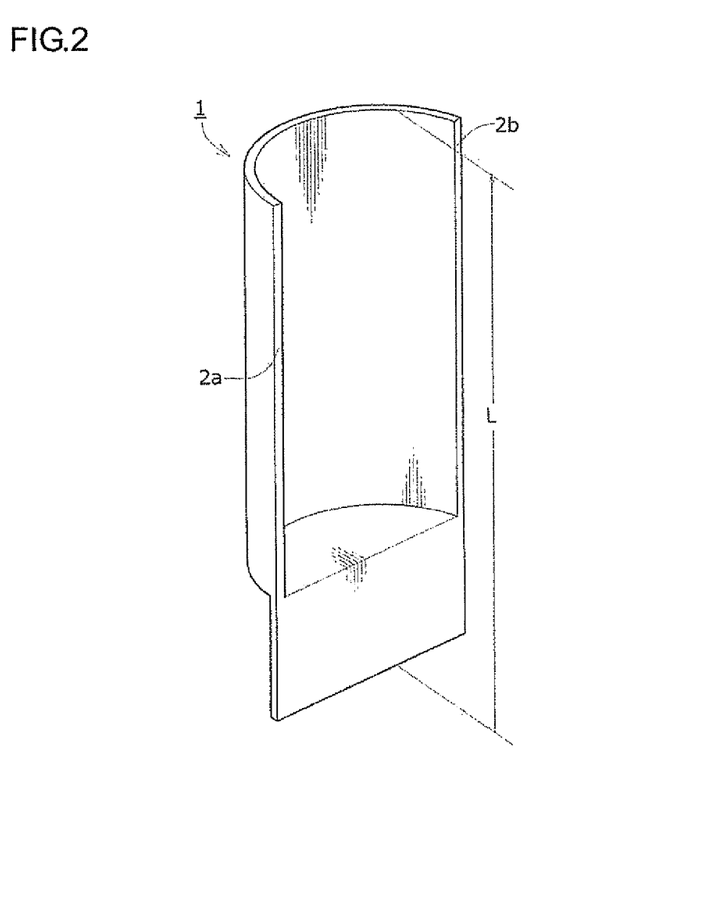
FIG. 2 is a perspective view schematically illustrating a skin-covered foamed molded article obtained in Examples.

Average Thickness T1 of Skin at Side Edges of Foamed Molded Article:

The thickness of the skin was measured at equally spaced apart 32 points along a central portion of each of the side edges 2a and 2b (64 points in total on both sides) of the skin-covered foamed molded article 1 shown in FIG. 2, and the measurements were arithmetically averaged to obtain the average thickness T1 [mm] of the skin at the side edges of the foamed molded article. In addition, the uniformity of the skin thickness was evaluated by dividing the average thickness T1 of the skin at the side edges of the foamed molded article by the average thickness T of the entire skin. The side edges of the foamed molded article are portions where the draw ratio is high and the parison tends to be excessively stretched during blow molding. As the parison is stretched not excessively but more uniformly during blow molding, the ratio T1/T of the average thickness of the skin at the side edges of the foamed molded article to the average thickness of the entire skin tends to be higher.

Minimum Thickness Tx of Skin at Side Edges of Foamed Molded Article:

The point where the skin thickness was minimum among the above-described 64 measuring points is named point X, and the skin thickness at the point X is defined as the minimum thickness Tx [mm] of the skin at side edges of the foamed molded article. In addition, the minimum thickness Tx was divided by the average thickness T1 to evaluate the uniformity of the skin thickness at the side edges of the foamed molded article. The higher the drawdown resistance of the parison, the uniformity of the skin thickness in the extrusion direction tends to be higher.

Degree of Fusion Bonding Between Skin and Foam Layer:

A measurement specimen with a size of 50 mm×50 mm× (thickness of the skin-covered foamed molded article) was cut out from a portion of the foamed molded article in the vicinity of the point X, where the degree of fusion-bonding between the skin and foam layer tends to be low. The specimen was bonded with an adhesive to jigs at its both sides. The jigs were pulled in opposite directions at a rate of 10 mm/min to separate the skin from the foam layer. The cross-section of the foam layer along which the skin was separated was examined to count the total number of expanded beads, the number of expanded beads which underwent material failure within beads (intra-bead material failure) and the number of expanded beads which underwent separation between beads (inter-beads separation). The percentage of the expanded beads which underwent intra-bead material failure and inter-beads separation to the total number of expanded beads was calculated and defined as the degree of fusion [%] between the skin and the foam layer at the point X.

Degree of Fusion Bonding Between Expanded Beads:

Specimens without skin with a size of 150 mm×150 mm× (thickness of the foam layer) were cut off from five areas, the four corners and the central portion, of the skin-covered foamed molded article. The specimens were divided into halves and the cross-section was observed to count the number of expanded polystyrene beads that underwent material failure (intra-bead separation) and the number of expanded polystyrene beads that were separated at the interface (inter-bead separation). The percentage of the number of expanded beads that underwent material failure based on the total number of expanded beads that underwent material failure and the expanded beads that were separated at interface was obtained for each specimen. The arithmetic average of the five specimens is defined as the degree of fusion bonding of the foam layer.

Surface Appearance:

The skin-covered foamed molded article was visually evaluated as follows:

Good: Slight degree of surface roughness was observed but the appearance was still acceptable for use as a product Excellent: No surface roughness was observed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all the changes which come within the meaning and range of equivalency of the claims are therefore intended to be embraced therein.

This application claims, under 35 USC 119, priority of Japanese Patent Applications No. 2012-097336 filed Apr. 23, 2012, the entire contents of the Japanese patent application being hereby incorporated by reference herein in their entirety.

What is claimed is:

1. A method for producing a skin-covered foamed molded article, the method comprising the steps of:
   (a) providing a parison that is in a molten or softened state;
   (b) blow molding the parison into a skin defining a hollow interior space;
   (c) filling expanded polystyrene beads in the hollow interior space; and (d) heating the expanded polystyrene beads filled in the hollow interior space to fuse-bond the expanded polystyrene beads to each other and to form a foam layer fuse-bonded to the skin, wherein step (a) comprises:

melting and kneading a mixture of 10 to 30 parts by weight of a polystyrene resin (A) having a ratio $Mw_A(abs)/Mw_A(r)$ of at least 1.4, where $Mw_A(abs)$ and $Mw_A(r)$ represent a weight average absolute molecular weight and a linear polystyrene equivalent weight average molecular weight, respectively, of the polystyrene resin (A), 5 to 30 parts by weight of an impact resistant polystyrene resin (B) containing a rubber component, and 40 to 80 parts by weight of a recycled polystyrene resin (C) to obtain a polystyrene resin composition; and extruding the polystyrene resin composition into the parison, wherein the total of the polystyrene resin (A), impact resistant polystyrene resin (B) and recycled polystyrene resin (C) is 100 parts by weight, wherein the recycled polystyrene is obtained from a resin composition which contains the polystyrene resin (A) and the polystyrene resin (B) and which has a weight ratio of the polystyrene resin (A) to the polystyrene resin (B) of 30:70 to 70:30, wherein the linear polystyrene equivalent weight average molecular weight $Mw_A(r)$ of the polystyrene resin (A) is $3.5 \times 10^5$ to $4.5 \times 10^5$, and wherein the polystyrene resin composition meets the following requirements (1) to (3):

(1) the polystyrene resin composition has a Charpy impact strength at 23° C. according to ISO179/1eA of at least 5 kJ/m$^2$;

(2) the polystyrene resin composition has a melt mass flow rate at a temperature of 200° C. and a load of 5 kg of 1.5 to 3.0 g/10 min;

(3) the polystyrene resin composition has a ratio Mws(abs)/Mws(r) of at least 1.4 where Mws(abs) and Mws(r) represent a weight average absolute molecular weight and a linear polystyrene equivalent weight average molecular weight, respectively, of the polystyrene resin composition.

2. The method according to claim 1, wherein the polystyrene resin (A) comprises a copolymer of a styrenic monomer with a multibranched macromonomer having a plurality of polymerizable double bonds.

3. The method according to claim 1, wherein the skin-covered foamed molded article has a length of 1 to 5 m.

4. The method according to claim 1, wherein the skin has an average thickness of 1 to 3 mm.

* * * * *